(12) United States Patent
Shioya et al.

(10) Patent No.: US 10,866,433 B2
(45) Date of Patent: Dec. 15, 2020

(54) OPTICAL ELEMENT

(71) Applicants: JINS HOLDINGS INC., Maebashi (JP); Tsubota Laboratory, Inc., Tokyo (JP)

(72) Inventors: Shunsuke Shioya, Maebashi (JP); Kazuo Tsubota, Tokyo (JP); Toshihide Kurihara, Tokyo (JP); Hidemasa Torii, Tokyo (JP)

(73) Assignees: JINS HOLDINGS Inc., Maebashi (JP); Tsubota Laboratory, Inc., Tokyo (JP)

( * ) Notice: Subject to any disclaimer, the term of this patent is extended or adjusted under 35 U.S.C. 154(b) by 60 days.

(21) Appl. No.: 15/778,015

(22) PCT Filed: Nov. 25, 2015

(86) PCT No.: PCT/JP2015/083084
§ 371 (c)(1),
(2) Date: May 22, 2018

(87) PCT Pub. No.: WO2017/090128
PCT Pub. Date: Jun. 1, 2017

(65) Prior Publication Data
US 2018/0341122 A1 Nov. 29, 2018

(51) Int. Cl.
*G02C 7/10* (2006.01)
*G02B 5/20* (2006.01)
(Continued)

(52) U.S. Cl.
CPC ............ *G02C 7/10* (2013.01); *G02B 5/20* (2013.01); *G02B 5/23* (2013.01); *G02B 5/28* (2013.01);
(Continued)

(58) Field of Classification Search
None
See application file for complete search history.

(56) References Cited

U.S. PATENT DOCUMENTS 5,470,932 A 11/1995 Jinkerson
8,210,678 B1 * 7/2012 Farwig ............... G02B 5/22
351/159.65
(Continued)

FOREIGN PATENT DOCUMENTS

JP S63-175824 A 7/1988
JP S64-078202 A 3/1989
(Continued)

OTHER PUBLICATIONS

International Search Report for International Application No. PCT/JP2015/083084, dated Feb. 16, 2016.
(Continued)

*Primary Examiner* — Darryl J Collins
(74) *Attorney, Agent, or Firm* — Wolf, Greenfield & Sacks, P.C.

(57) ABSTRACT

An optical element has a transmission spectrum characterized in that a local maximum falls within a wavelength region longer than 315 nm but shorter than or equal to 400 nm, a local minimum falls within a wavelength region longer than or equal to 380 nm but shorter than or equal to 500 nm, and the wavelength at the local maximum is shorter than the wavelength at the local minimum.

14 Claims, 12 Drawing Sheets

(51) Int. Cl.
    *G02C 7/02*    (2006.01)
    *G02B 5/28*    (2006.01)
    *G02B 5/23*    (2006.01)
    *G02C 7/04*    (2006.01)

(52) U.S. Cl.
    CPC .............. *G02B 5/283* (2013.01); *G02C 7/02* (2013.01); *G02C 7/028* (2013.01); *G02C 7/044* (2013.01); *G02C 7/102* (2013.01); *G02C 7/104* (2013.01); *G02C 7/107* (2013.01); *G02C 2202/24* (2013.01)

(56) References Cited

U.S. PATENT DOCUMENTS

| | | | |
|---|---|---|---|
| 8,911,082 | B2 | 12/2014 | Ambler |
| 2002/0118431 | A1 | 8/2002 | Sommer et al. |
| 2007/0171537 | A1* | 7/2007 | Fung .................. G02C 7/12 359/642 |
| 2007/0282437 | A1 | 12/2007 | Hermitic et al. |
| 2008/0094566 | A1* | 4/2008 | Ishak .................. G02C 7/104 351/44 |
| 2011/0075096 | A1 | 3/2011 | Ishak et al. |
| 2014/0091419 | A1* | 4/2014 | Hasegawa ............ G02B 13/004 257/432 |
| 2015/0316688 | A1 | 11/2015 | Cefalo et al. |
| 2016/0209678 | A1 | 7/2016 | Nishimoto |
| 2016/0209679 | A1 | 7/2016 | Nishimoto |
| 2017/0168320 | A1 | 6/2017 | Tsubota et al. |
| 2018/0321510 | A1* | 11/2018 | Vetro .................. G02B 5/223 |

FOREIGN PATENT DOCUMENTS

| | | |
|---|---|---|
| JP | H01-299560 A | 12/1989 |
| JP | H08-503997 A | 4/1996 |
| JP | 2003-535368 A | 11/2003 |
| JP | 2004-219900 A | 8/2004 |
| JP | 2009-540393 A | 11/2009 |
| JP | 2012-522270 A | 9/2012 |
| JP | 2013-222212 A | 10/2013 |
| JP | 2014-174482 A | 9/2014 |
| JP | 2015-049338 A | 3/2015 |
| JP | 2015-049339 A | 3/2015 |
| WO | WO 2007/146933 | 12/2007 |
| WO | WO 2008/067109 | 6/2008 |
| WO | WO 2010/111499 A1 | 9/2010 |
| WO | WO 2013/168565 A1 | 11/2013 |
| WO | WO 2015/171507 A1 | 11/2015 |
| WO | WO 2015/186723 | 12/2015 |

OTHER PUBLICATIONS

Written Opinion for International Application No. PCT/JP2015/083084, dated Feb. 16, 2016.
Iwase et al., Prevalence and causes of low vision and blindness in a Japanese adult population: The Tajimi Study. Ophthalmology. 2006;113(8):1354-62.e1.
Morgan et al., Myopia. Lancet. May 5, 2012;379:1739-48.
Saito et al., Protective effects of metallothionein I and II against metal- and ultraviolet radiation-induced damage in cultured lens epithelial cells. Jpn Ophthalmol. 2010;54:486-93.
Söderberg, Optical radiation and the eyes with special emphasis on children. Progress in Biophysics and Molecular Biology. 2011;107:389-92.

* cited by examiner

Fig. 3

| RADIATION DISTANCE h | RADIATION INTENSITY AT POINT P mW/cm² |
|---|---|
| 100 | 2.5 |
| 90 | 2.7 |
| 80 | 3.1 |
| 70 | 3.5 |
| 60 | 4.1 |
| 50 | 5.0 |

Mann-Whitney U test

Fig. 11

| BASE | THIOURETHANE RESIN | | |
|---|---|---|---|
| HARD COAT | ORGANIC SILICON COMPOUND | 3~5 | μm |
| FIRST LAYER | SiO2 | 65 | nm |
| SECOND LAYER | ZrO2 | 30 | nm |
| THIRD LAYER | SiO2 | 55 | nm |
| FOURTH LAYER | ZrO2 | 30 | nm |
| FIFTH LAYER | SiO2 | 100 | nm |
| SIXTH LAYER | ZrO2 | 13 | nm |
| SEVENTH LAYER | SiO2 | 55 | nm |
| EIGHTH LAYER | ZrO2 | 130 | nm |
| NINTH LAYER | SiO2 | 45 | nm |
| TENTH LAYER | ZrO2 | 35 | nm |
| ELEVENTH LAYER | SiO2 | 35 | nm |
| TWELFTH LAYER | ZrO2 | 75 | nm |
| THIRTEENTH LAYER | SiO2 | 95 | nm |

OPTICAL ELEMENT

RELATED APPLICATIONS

This application is a national stage filing under 35 U.S.C. § 371 of International Application No. PCT/JP2015/083084 filed Nov. 25, 2015, the entire contents of which is incorporated by reference herein.

TECHNICAL FIELD

The present invention relates to an optical element.

BACKGROUND ART

A wide variety of glasses, contact lenses, and the like that prevent passage of ultraviolet light are on the market. The reason for this is that there have been reports stating that eyes are damaged in a variety of manners when receiving ultraviolet light (see Non Patent Literature 1, for example).

On the other hand, myopia, which tends to increase worldwide, is classified into refractive myopia and axial myopia. The majority of myopia is axial myopia, about which it is known that the myopia progresses as the axial length of the eye increases and the increase is irreversible (see Non Patent Literature 2, for example). It is further known that excessive myopia, which is the state in which myopia has progressed, is the primary cause of loss of eyesight (see Non Patent Literature 3, for example).

CITATION LIST

Non Patent Literature

Non Patent Literature 1: Saito et al., Jpn Ophthalmol 2010; 54: 486-493, Per G. Soderberg, Progress in Biophysics and Molecular Biology 107 (2011) 389-392 Non Patent Literature 2: Morgan I G et al., Lancet, 2012 Non Patent Literature 3: Iwase A. et al., Ophthalmology, 2006

SUMMARY OF INVENTION

Technical Problem

In recent years, means for preventing the onset of myopia and means for delaying the progress of myopia have been actively studied, but no effective means has been found yet. Further, an idea of considering asthenopia as well as preventing the onset of myopia or delaying myopia has not existed in the first place. An object of the present invention is to provide an optical element capable of reducing asthenopia as well as providing an effect of preventing or delaying myopia.

Solution to Problem

An optical element has a transmission spectrum characterized in that a local maximum falls within a wavelength region longer than 315 nm but shorter than or equal to 400 nm, a local minimum falls within a wavelength region longer than or equal to 380 nm but shorter than or equal to 500 nm, and a wavelength at the local maximum is shorter than a wavelength at the local minimum.

BRIEF DESCRIPTION OF DRAWINGS

FIG. 3 is a table showing the relationship between the intensity of the ultraviolet light emitted from the UVA radiator used in Specific Example 2 of myopia suppression and the distance to the UVA radiator.

FIG. 11 shows an example of the structure of the optical element in the present embodiment.

DESCRIPTION OF EMBODIMENT

Figure 1:
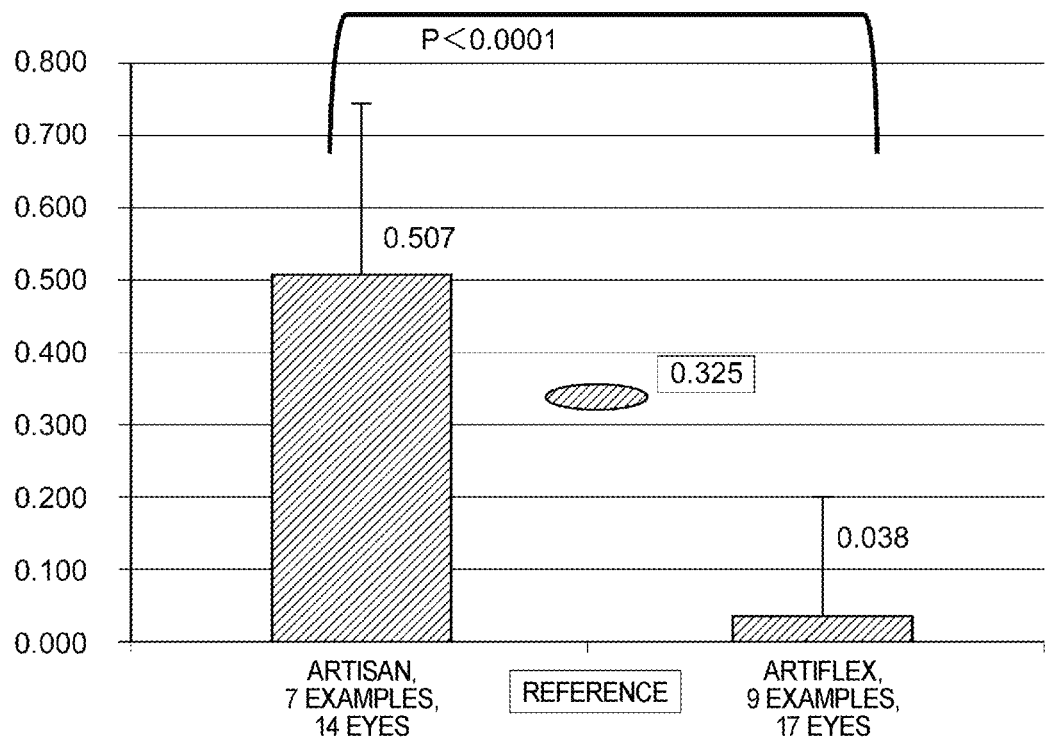
FIG. 1 shows graphs illustrating the degrees of increase in the axial length of eyes including eyes in which one of two types of intraocular lenses is implanted and reference eyes in Specific Example 2 of myopia suppression.

The invention of the present application has been created based on novel findings described in the PCT application (PCT/JP2015/65997) invented by Kazuo Tsubota, who is one of the inventors of the present application, Ikkyu Negishi, Hidemasa Torii, and Toshihide Kurihara and filed by the educational institution Keio University. The novel findings described above will first be described with reference as appropriate to the filed document of the PCT application described above.

An embodiment of the present invention attained based on the findings will then be described in detail with reference to Example. The objects, features, advantages, and ideas of the present invention are apparent to a person skilled in the art who reads the description of the present specification, and a person skilled in the art can readily reproduce the present invention based on the description of the present specification. The embodiment, the specific example, and the like described below represent preferable aspects in which the present invention is embodied and are presented by way of example or explanation, so that the present invention is not limited thereto. It is apparent to a person skilled in the art that a variety of changes and modifications can be made to the embodiment and the specific example based on the description of the present specification within the intention and scope of the present invention disclosed in the present specification.

[Novel Findings Regarding Myopia Prevention] (Novel Findings Described in Filed Document of PCT Application (PCT/JP2015/65997))

The novel findings described above are those showing that the wavelengths in the ultraviolet region allow prevention of myopia. "Prevention of myopia" used herein includes prevention of the onset of myopia and delay of the progress of myopia. The novel findings will be described below.

The ultraviolet light is classified into UVA, UVB, and UVC in terms of wavelength. The wavelengths of UVA range from 315 to 400 nm, the wavelengths of UVB range from 280 to 315 nm, and the wavelengths of UVC range from 100 to 280 nm. A myopia prevention article invented based on the findings described above prevents myopia by allowing the eyes to receive ultraviolet light having wavelengths longer than (or longer than or equal to) 315 nm but shorter than or equal to 400 nm, preferably, longer than or equal to 360 nm but shorter than or equal to 400 nm. The ultraviolet light within the range described above may mean the entire ultraviolet light throughout the wavelengths within the range or the ultraviolet light having part of the wavelengths within the range.

(1) Myopia Prevention Article Including Light Transmitting Portion

The myopia prevention article including a light transmitting portion (or also referred to as "optical element") may be an article including a light transmitting portion made of a material that transmits ultraviolet light having wavelengths longer than 315 nm but shorter than or equal to 400 nm, preferably, longer than or equal to 360 nm but shorter than or equal to 400 nm out of the wavelengths of natural light, artificial light, and other types of light but does not transmit ultraviolet light having wavelengths shorter than or equal to 315 nm.

The light transmitting portion of the myopia prevention article may be a single part that transmits ultraviolet light having wavelengths longer than 315 nm but shorter than or equal to 400 nm, preferably, longer than or equal to 360 nm but shorter than or equal to 400 nm but does not transmit ultraviolet light having wavelengths shorter than or equal to 315 nm or may be the combination of a part that transmits ultraviolet light having wavelengths longer than 315 nm but shorter than or equal to 400 nm, preferably, longer than or equal to 360 nm but shorter than or equal to 400 nm and a part that does not transmit ultraviolet light having wavelengths shorter than or equal to 315 nm.

Specific examples of the myopia prevention article may include a vision corrector (such as spectacle lens, contact lens, and intraocular lens), an eye protector (such as sunglasses, protection glasses, and goggles), a face protector (such as shield of helmet), a sunscreen (such as parasol and sun visor), a display screen of a display apparatus (such as television, monitor for personal computer, game console, portable media player, mobile phone, tablet terminal, wearable device, 3D glasses, virtual glasses, portable book reader, car navigator, digital camera and other imaging devices, in-vehicle monitor, and in-airplane monitor), a curtain (such as cloth curtain and vinyl curtain), a window (such as windows of building, vehicle, and airplane, and front or rear windshield), a wall (such as glass curtain wall), a cover of a light source (such as illumination cover), and a coating material (such as seal and application liquid) but not limited thereto in the present invention.

The material of the light transmitting portion may be so processed as to transmit ultraviolet light having wavelengths longer than 315 nm but shorter than or equal to 400 nm, preferably, longer than or equal to 360 nm but shorter than or equal to 400 nm but not to transmit ultraviolet light having wavelengths shorter than or equal to 315 nm or 360 nm. For example, the light transmitting portion is made of a glass material, a plastic material, or any other material but not necessarily. The material of the light transmitting portion may, for example, be a known ultraviolet light absorbing agent or an ultraviolet light scattering agent.

The phrase "does not transmit ultraviolet light" means, for example, that the transmittance of ultraviolet light is preferably 1% or lower, more preferably, 0.1% or lower. A method for measuring the transmittance of ultraviolet light is well known to a person skilled in the art, and the transmittance of ultraviolet light can be measured with any known measuring apparatus and method.

The transmittance of ultraviolet light having wavelengths longer than 315 nm but shorter than or equal to 400 nm, preferably, longer than or equal to 360 nm but shorter than or equal to 400 nm may be so chosen as to be adequate transmittance in accordance with the amount of ambient ultraviolet light. The adequate transmittance in this case is preferably 21% or higher, more preferably, 30% or higher.

The intensity of the ultraviolet light having wavelengths longer than 315 nm but shorter than or equal to 400 nm, preferably, longer than or equal to 360 nm but shorter than or equal to 400 nm is preferably 5.0 mW/cm$^2$ or lower, more preferably, 3.0 mW/cm$^2$ or lower, still more preferably, 1.0 mW/cm$^2$ or lower, still more preferably, 0.5 mW/cm$^2$ or lower, still more preferably, 0.25 mW/cm$^2$ or lower. The intensity can be measured by using a known method.

(2) Myopia Prevention Method

A myopia prevention method includes allowing a subject to wear the myopia prevention article including the light transmitting portion described above. The wearing method is not limited to a specific method, and the myopia prevention article may be appropriately worn in accordance with the type of the myopia prevention article.

The method described above may be applied to a person and a non-human vertebrate animal.

(3) Method for Investigating Ultraviolet Light Suitable for Myopia Prevention

A method for identifying the ultraviolet light suitable for myopia prevention is a method for examining whether ultraviolet light having predetermined wavelengths out of the range longer than 315 nm but shorter than or equal to 400 nm, preferably, longer than or equal to 360 nm but shorter than or equal to 400 nm can prevent myopia, and the method includes irradiating a person or a non-human vertebrate animal with the ultraviolet light of the wavelengths. Whether the wavelengths can actually prevent myopia is then examined, for example, by using the method described in Specific Example 2. Which wavelength or which wavelength range is highly effective out of the range longer than 315 nm but shorter than or equal to 400 nm, preferably, longer than or equal to 360 nm but shorter than or equal to 400 nm can thus be identified.

Specific Example 1

As the myopia prevention article including the light transmitting portion that transmits ultraviolet light having wavelengths longer than 315 nm but shorter than or equal to 400 nm but does not transmit ultraviolet light having wavelengths shorter than or equal to 315 nm, a phakic intraocular lens was used by way of example to verify the myopia prevention effect thereof in the following experiment:

The axial length of an eye was first measured, and the following products were implanted in the measured eye in a surgical operation: Artisan (product name) Model 204 (manufactured by Ophtec B.V.), which is a phakic intraocular lens that transmits almost no ultraviolet light over the entire ultraviolet wavelength range; or Artiflex (product name) Model 401 (manufactured by Ophtec B.V.), which is a phakic intraocular lens that only transmits ultraviolet light having wavelengths ranging from about 350 to 400 nm. An increase in the axial length of each of the eyes was then measured five years after the implantation. The axial length of each of the eyes was measured with IOL Master (manufactured by Carl Zeiss Meditec A.G.) by using a standard method.

On the other hand, as reference eyes, the degrees of two-year increase in the axial length of 185 excessive myopia eyes having undergone no refraction correction operation were measured, and the degrees were averaged. The average increase in the axial length of the reference eyes was 0.065 mm/year (for details, refer to Saka N et al., Graefes Arch Clin Exp Ophthalmol., Vol. 251, pp. 495-499, 2013). The axial length of each of the eyes was measured by using the IOL Master as described above.

FIG. 1 shows the degrees of the 5-year increase in the axial length of eyes including 14 eyes (average age of subjects: 35. 7) in 7 examples using Artisan (product name), 17 eyes (average age of subjects: 36.1) in 9 examples using Artiflex (product name), and the reference eyes (185 eyes, average age of subjects: 48.4).

In the example shown in FIG. 1, the degrees of 5-year increase in the axial length of the eyes using Artisan (product name) and the eyes using Artiflex (product name) are each the difference between the axial length of the eye before and after the implantation, and the degree of 5-year increase in the axial length of the reference eyes is the average increase in the axial length of the eyes per year determined as described above and multiplied by 5.

As shown in FIG. 1, the degrees of increase in the axial length of the eyes having received ultraviolet light only having wavelengths ranging about from 350 to 400 nm are significantly smaller than those for the eyes having received almost no ultraviolet light over the entire ultraviolet wavelength range.

Specific Example 2

An UVA radiator that emits ultraviolet light having wavelength longer than 315 nm but shorter than or equal to 400 nm was used by way of example, and the myopia prevention effect was verified in the following experiment.

It is known that one eye of a chick is covered with a transparent hemisphere and myopia occurs in the eye (blocked eye) (see Seko et al., Invest. Ophthalmol. Vis. Sci. May 1995 vol. 36 no. 6, 1183-1187, for example). In view of the knowledge described above, one eye of each of 30 White-Leghorn 6-day-old chicks was covered with a transparent hemisphere, and the 30 chicks were separated into a group of 15 non-UVA-irradiated chicks, which were irradiated with no UVA, and a group of 15 UVA-irradiated chicks, which were irradiated with UVA. The two groups were raised for one week under the condition that each day was divided into bright 12 hours and dark 12 hours, and the degrees of progress of myopia of the blocked eyes were studied.

The UVA was radiated from a PL-S TL/08 UV lamp (manufactured by Philips N.V.) at a UVA intensity of 1.7 W.

Figure 2:
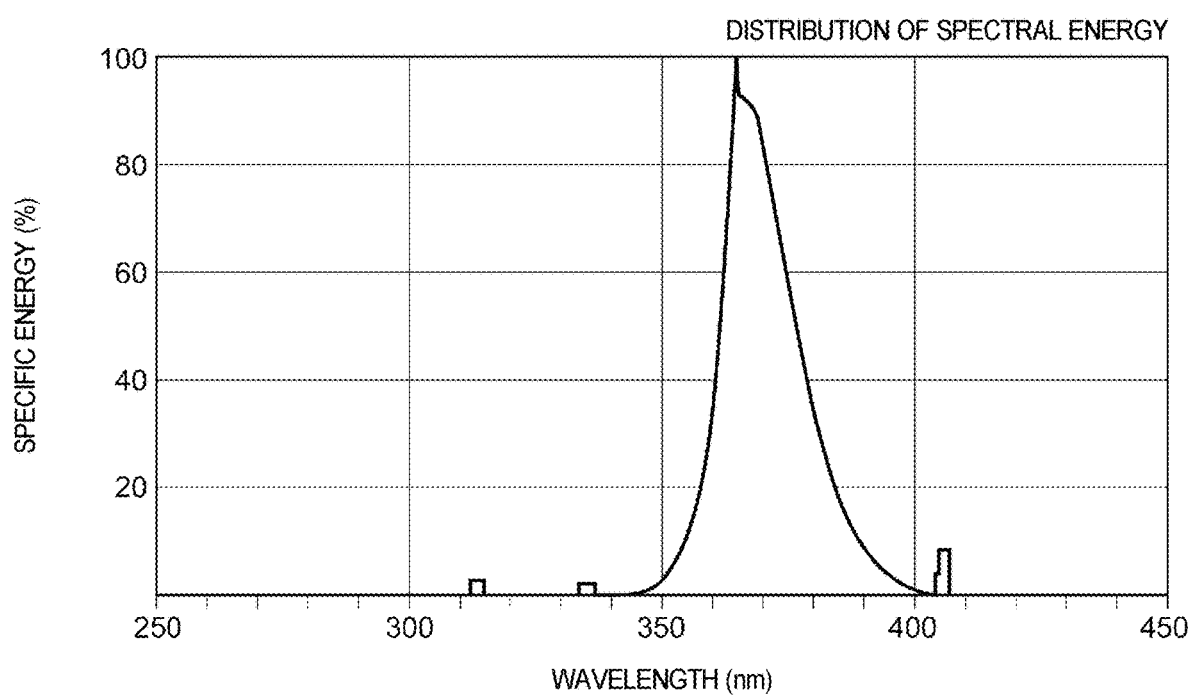
FIG. 2 is a graph showing the relationship between the intensity of ultraviolet light emitted from a UVA radiator used in Specific Example 2 of myopia suppression and the wavelength of the ultraviolet light.

FIG. 2 shows the distribution of the spectral energy from the UVA radiator. FIG. 3 shows the relationship between the intensity of the radiated ultraviolet light and the distance to the lamp.

The diopter, the vitreous body cavity length, and the axial length of the blocked eye of each of 14 13-day-old (one week after start of blockage) chicks out of the non-UVA-irradiated group and 13 13-day-old chicks out of the UVA-irradiated group were measured. The diopter was measured with an automatic refractometer by using a standard method. The vitreous body cavity length and the axial length of the eye were measured with US-4000 (manufactured by Nidec Co., Ltd.) in the B mode.

Figure 4:
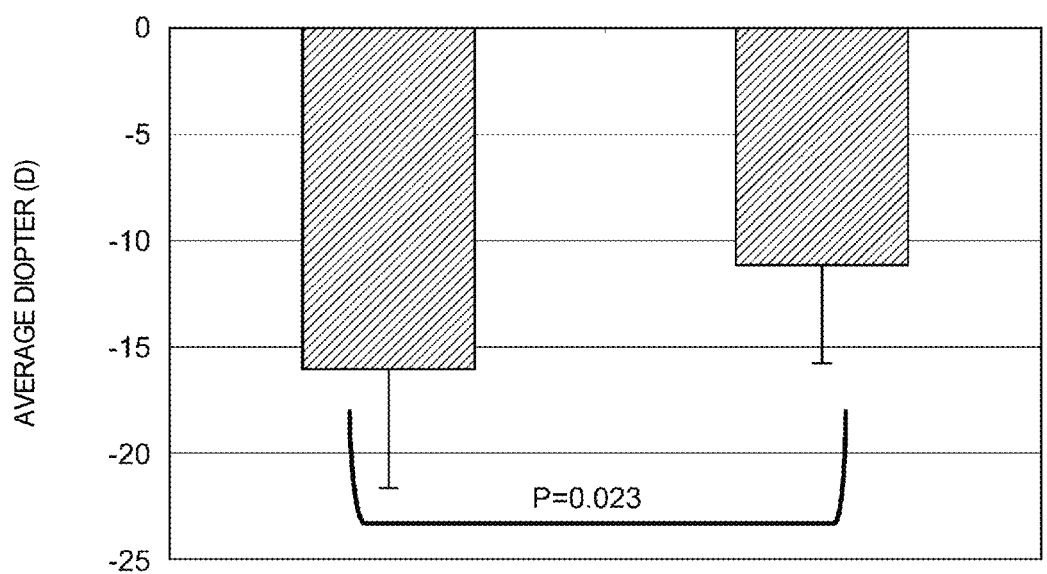
FIG. 4 shows graphs illustrating the diopter of eyes of chicks irradiated with UVA and the diopter of eyes of chicks irradiated with no UVA in Specific Example 2 of myopia suppression.
Figure 5:
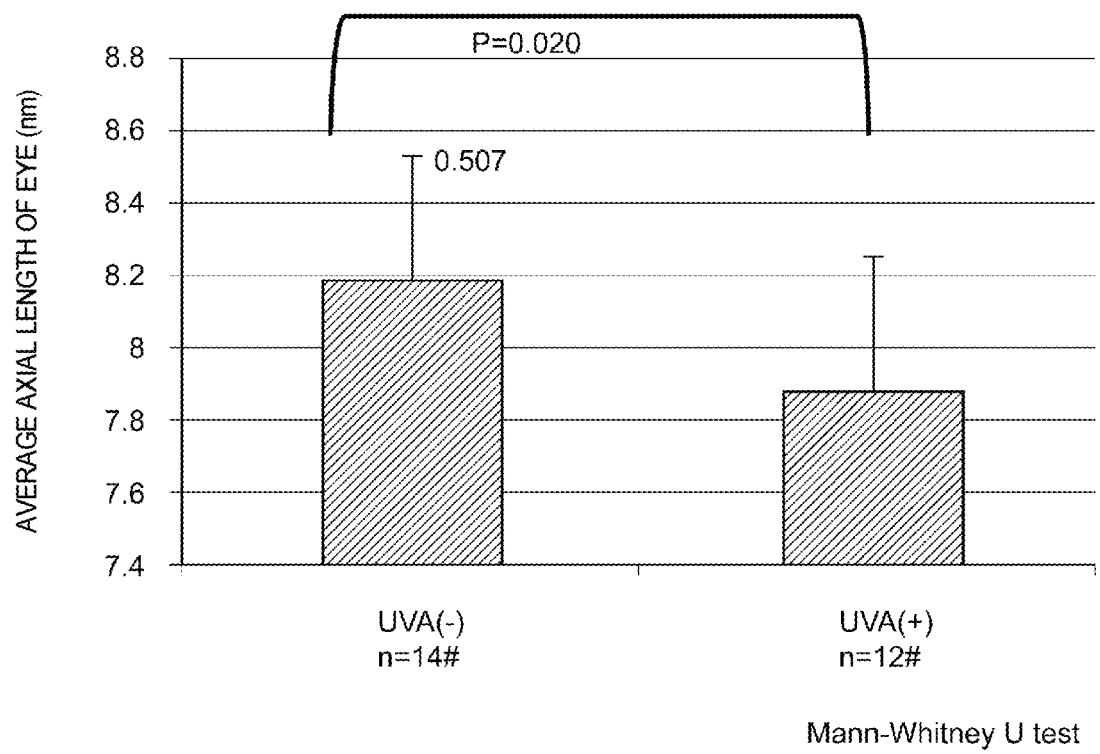
FIG. 5 shows graphs illustrating the axial lengths of eyes of the chicks irradiated with UVA and the axial lengths of eyes of the chicks irradiated with no UVA in Specific Example 2 of myopia suppression.

FIG. 4 shows results of the measurement of the diopter. FIG. 5 shows results of the measurement of the axial length of the eye. Mann-Whitney U test was used for significant difference test.

As shown in FIG. 4, the average diopter of the blocked eyes in the UVA-irradiated group is significantly greater than the average diopter of the blocked eyes in the non-UVA-irradiated group (UVA radiation provided myopia prevention effect). Further, as shown in FIG. 5, the average axial length of the blocked eyes in the UVA-irradiated group is significantly smaller than the average axial length of the blocked eyes in the non-UVA-irradiated group. It is therefore clearly demonstrated that the degree of myopia in the UVA-irradiated group is significantly smaller than that in the non-UVA-irradiated group. Further, the intensity values shown in FIGS. 2 and 3 show that myopia prevention effect was achieved with relatively low UVA.

Specific Example 3

Figure 6:
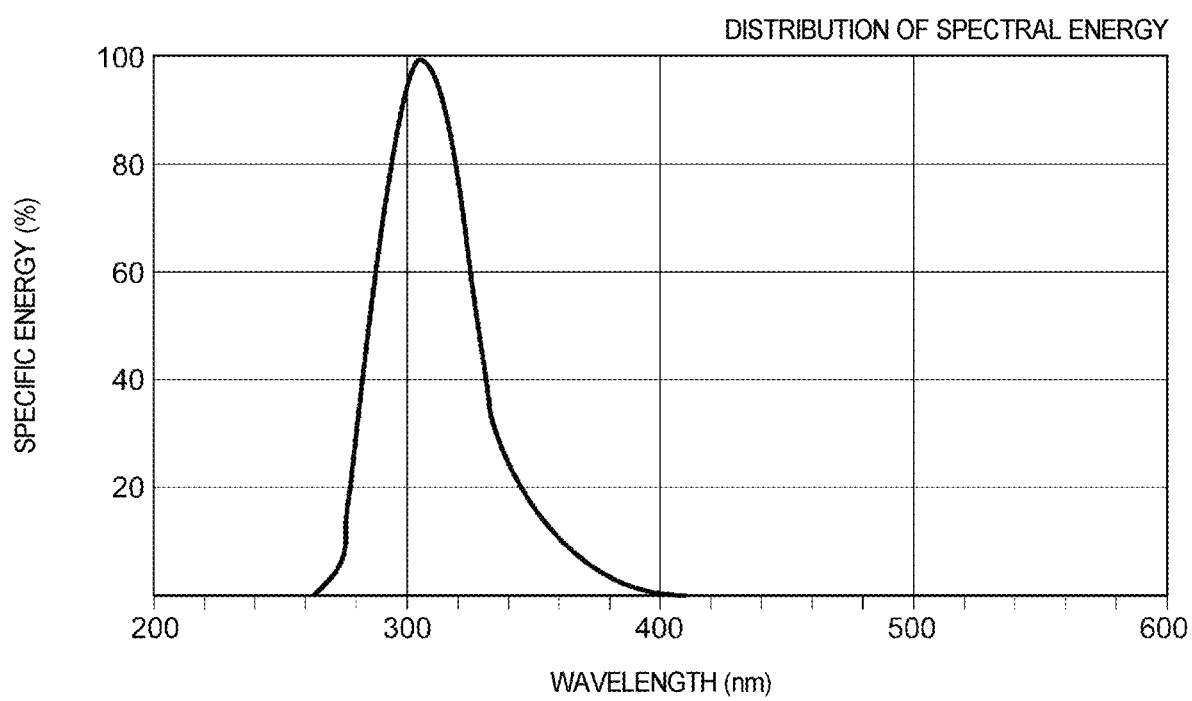
FIG. 6 is a graph showing the relationship between the intensity and wavelength of short-wavelength light the intensity of which peaks at 305 nm and which is radiated from a UVA radiator used in Specific Example 3 of myopia suppression.

FIG. 6 shows short-wavelength light the intensity of which peaks at 305 nm. When a 5-day-old chick was irradiated with the short-wavelength light shown in FIG. 6 for 2 days, epithelial erosion was formed on the cornea of the chick. Since the short-wavelength light strongly causes tissue injury, the light radiated for the myopia prevention preferably has wavelengths longer or equal to 340 nm, more preferably, longer than or equal to 350 nm, still more preferably, longer than or equal to 360 nm.

Specific Example 4

To provide the myopia suppression effect based on the short-wavelength light having wavelengths longer than 315 nm but shorter than or equal to 400 nm, it is effective to use a lamp that emits light having the wavelengths and glasses having lenses that pass the light in combination.

Figure 7:
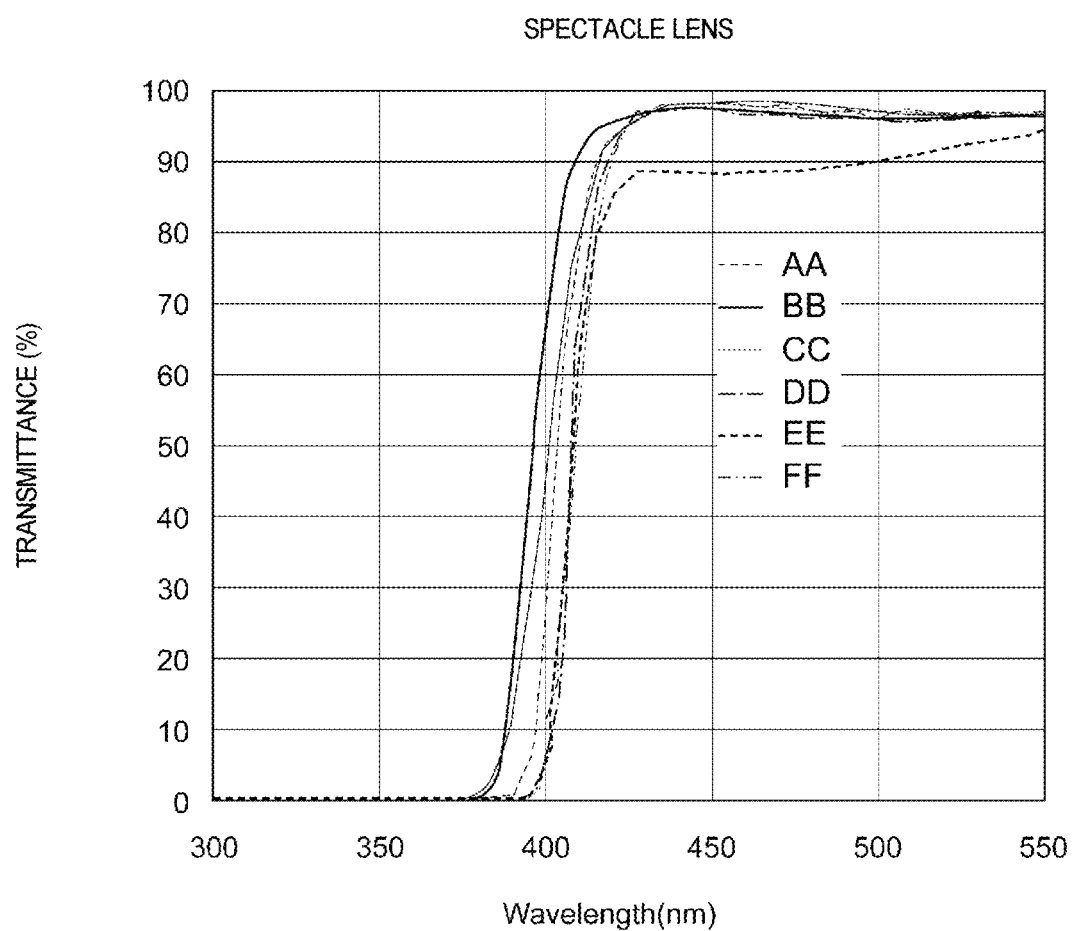
FIG. 7 shows an example of the spectra of light having passed through spectacle lenses that hardly transmit no short-wavelength light having wavelengths longer than 315 nm but shorter than or equal to 400 nm and therefore provide no myopia suppression effect and are used in Specific Example 4 of myopia suppression.

Glasses already available on the market do not provide the effect described in the present patent. As an example, FIG. 7 shows the spectra of light having passed through spectacle lenses (AA to FF) that hardly transmit the short-wavelength light or therefore do not provide the myopia suppression effect.

Figure 8:
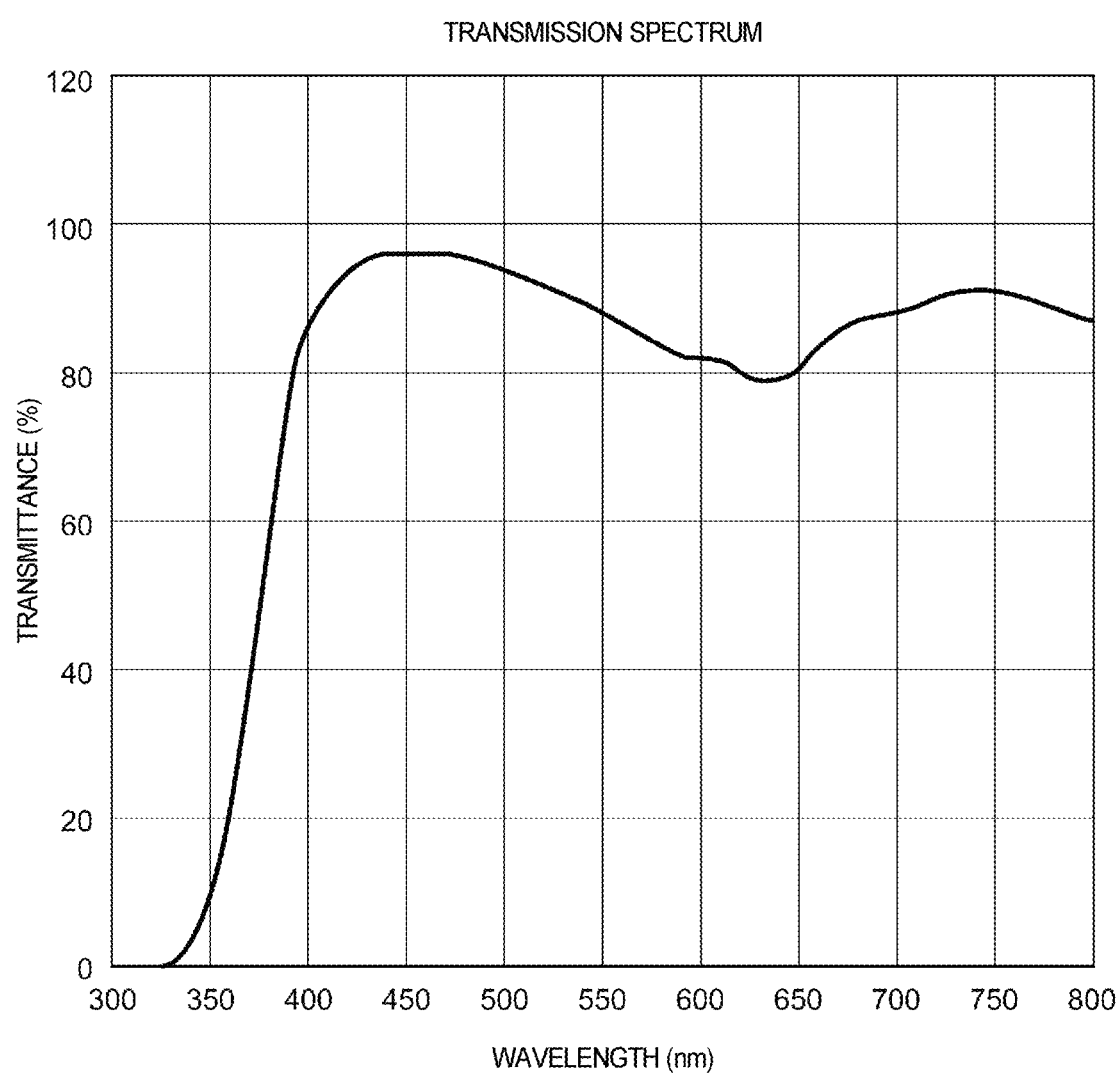
FIG. 8 shows the transmission spectrum provided by a spectacle lens that transmits the short-wavelength light having wavelengths longer than 315 nm but shorter than or equal to 400 nm in Specific Example 4 of myopia suppression.

FIG. 8 shows an example of the spectrum of light having passed through a spectacle lens that transmits the short-wavelength light effective in myopia prevention. Using the glasses described with reference to FIG. 8 in combination, for example, with a lamp that radiates light the intensity of which peaks at a wavelength of about 380 nm allows the myopia suppression effect to be efficiently provided.

As described above, allowing eyes to receive ultraviolet light having wavelengths longer than 315 nm but shorter than or equal to 400 nm, preferably, longer than or equal to 360 nm but shorter than or equal to 400 nm can prevent the onset of myopia of the eyes and can delay the progress of the myopia.

Embodiment According to Invention of Present Application

A description will next be made of an optical element invented by the inventors of the present application based on the findings described above and capable of reducing asthenopia while providing the myopia prevention effect. The following description will be made of an embodiment of an optical element providing the myopia prevention effect and capable of reducing eyestrain and improving visual recognition.

<Characteristics of Optical Element>

Figure 9:
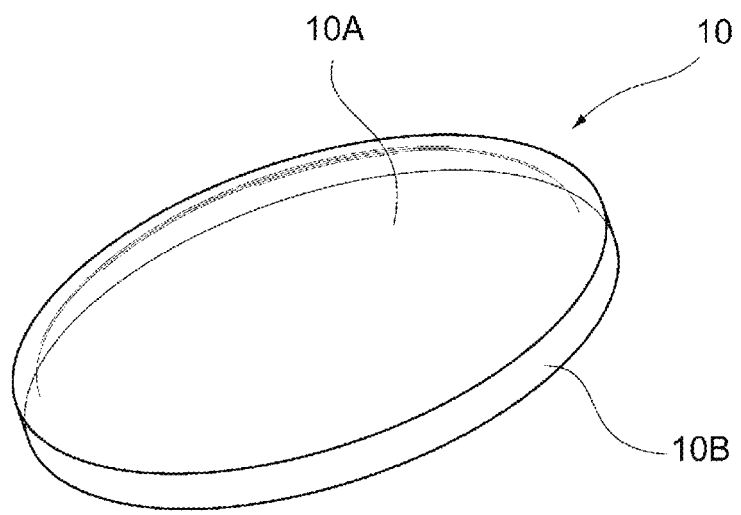
FIG. 9 shows an example of an optical element in an embodiment of the present invention.

FIG. 9 shows an example of an optical element 10 in the present embodiment. It is assumed that the optical element 10 in the present embodiment is used, for example, as a lens used with an eyewear to suppress myopia, and the optical element 10 has the characteristics of the light transmitting portion described above that transmits the wavelengths effective in myopia suppression and further has characteristics for reducing eyestrain and improving visual recognition. The optical element 10, to provide the characteristics described above, is so configured that a base 10B is provided with a layered structure (layered films) 10A on opposite sides or one side of the optical element 10. The layered structure 10A will be described later with reference to FIG. 11. A novel optical element 10 for suppressing myopia can thus be provided. The optical element 10 may be shaped as appropriate and attached to a frame of an eyewear.

Figure 10:
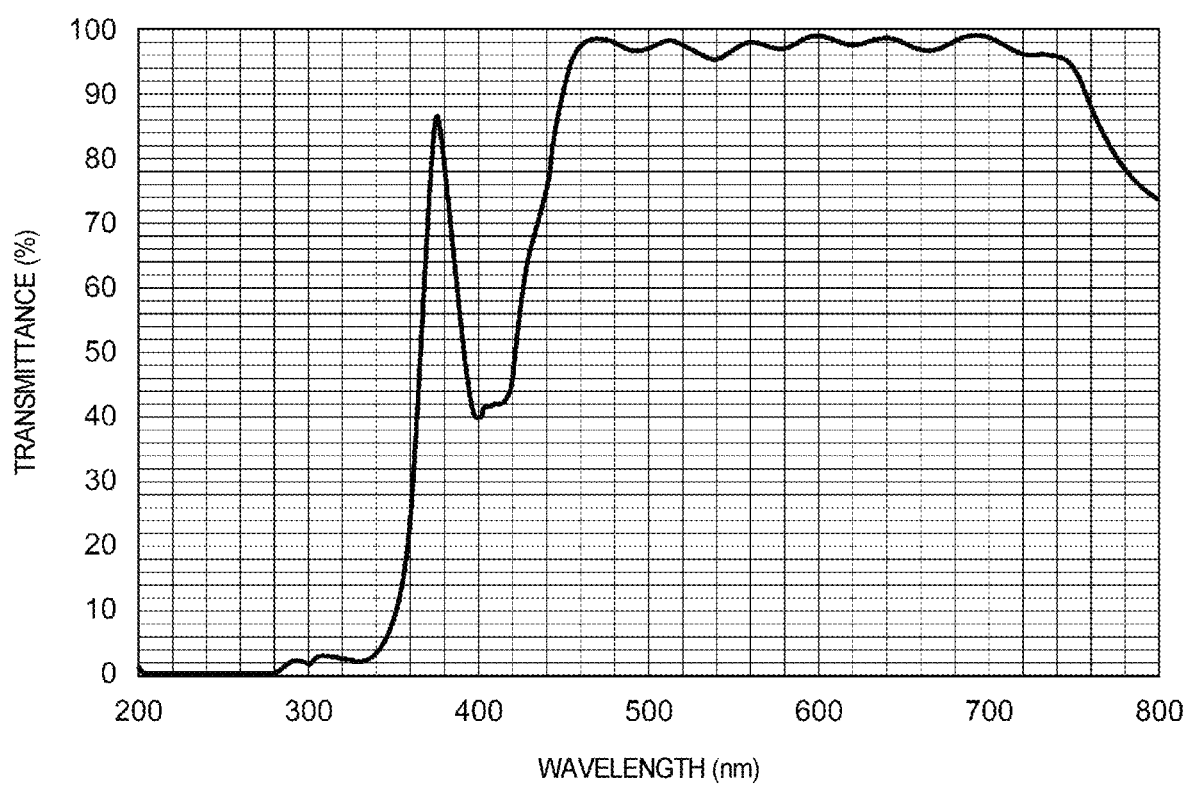
FIG. 10 shows an example of the transmission spectrum provided by the optical element in the present embodiment.

FIG. 10 shows an example of the transmission spectrum provided by the optical element 10 in the present embodiment. The transmission spectrum shown in FIG. 10 has a local maximum in the vicinity of 380 nm and a local minimum in the vicinity of 400 nm. In the transmission spectrum shown in FIG. 10, the transmittance starts increasing to about 100% in the vicinity of 460 nm, and the transmittance starts decreasing to about 0% in the vicinity of 340 nm.

The transmission spectrum shown in FIG. 10 is provided in a case where light is incident on the surface of the optical element 10 at roughly right angles. The optical element 10 may be configured to have the transmission spectrum characteristics shown in FIG. 10 even when light is obliquely incident on the surface of the optical element 10. The transmission spectrum characteristics shown in FIG. 10 are therefore not necessarily specific to the light incident roughly at right angles.

The optical element 10 in the present embodiment, which provides the transmission spectrum having the local maximum described above, transmits light having wavelengths within the ultraviolet region to provide the myopias suppression effect. Further, the optical element 10 in the present embodiment, which provides the transmission spectrum having the local minimum described above, absorbs or reflects what is called blue light to provide an effect of preventing eyestrain and deterioration of visual recognition. It is known that the blue light causes eyestrain and deterioration of visual recognition. For example, the blue light, which has short wavelengths and therefore tends to scatter, scatters in an eye and therefore compromise visibility.

The optical element 10 in the present embodiment may alternatively be configured to have a local maximum in the range longer than 315 nm but shorter than or equal to 400 nm, preferably, longer than or equal to 360 nm but shorter than or equal to 400 nm for good transmission of ultraviolet light having wavelengths in the vicinity of the local maximum and hence for the myopia suppression effect. Specific Example 3 has shown that the ultraviolet light having wavelengths longer than or equal to 360 nm is suitable for myopia suppression while protecting eyes.

Further, the optical element 10 in the present embodiment may alternatively be configured to have a local minimum in the range longer than 380 nm but shorter than or equal to 500 nm, preferably, longer than or equal to 400 nm but shorter than or equal to 460 nm for no transmission of ultraviolet light having wavelengths in the vicinity of the local minimum for prevention of eyestrain and deterioration of visual recognition. In general, it is known that the blue light suppresses secretion of melatonin. For example, setting a local minimum at a wavelength longer than or equal to 400 nm but shorter than or equal to 460 nm can prevent suppression of the secretion of melatonin, which causes sleepiness, whereby disturbance of the circadian rhythm can be avoided.

Further, the optical element 10 in the present embodiment is so designed that the transmittance at wavelengths shorter than or equal to 315 nm is lower than a first threshold. The first threshold is, for example, 5% and is preferably set at a smallest possible value. The reason for this is that transmission of light having unnecessary low wavelengths should be avoided. Further, the optical element 10 in the present embodiment is so designed that the transmittance at wavelengths longer than or equal to 500 nm is higher than a second threshold. The second threshold is, for example, 95% and is preferably set at a largest possible value. The reason for this is that transmission of necessary visible light should be achieved.

The local maximum may be so set as not to fall within the region shorter than 360 nm. That is, the local maximum may be so set as to fall only within the region longer than or equal to 360 nm but shorter than or equal to 400 nm. As a result, the wavelength at the local maximum is an appropriate wavelength set in consideration of eye protection and myopia suppression, whereby unnecessary ultraviolet region can be removed. Further, the local minimum may be so set as not to fall within the region shorter than 400 nm or the region longer than or equal to 460 nm. That is, the local minimum may be so set as to fall only within the region longer than or equal to 400 nm but shorter than or equal to 460 nm. As a result, the wavelength at the local minimum is an appropriate wavelength from the viewpoint of visual recognition for transmission of necessary visible region.

Only two extreme values, a local maximum and a local minimum, may fall within the wavelength region longer than 315 nm but shorter than or equal to 500 nm. As a result, a minimum necessary number of extreme values can be used to generate a transmission spectrum characterized by transmission of desired light. When two extreme values are present in the wavelength region longer than 315 nm but shorter than or equal to 500 nm, a transmission spectrum having a relatively simple shape is provided, whereby the optical element 10 can be readily designed.

The local maximum is the transmittance greater than or equal to a third threshold, and the local minimum is transmittance that falls within a predetermined range greater than or equal to a fourth threshold but smaller than or equal to a fifth threshold. For example, the third threshold is set at 80%, the fourth threshold is set at 40%, and the fifth threshold is set at 60%. Since the color corresponding to the wavelengths of the blue light is one of the three primary colors, the local minimum should not be too small to excessively remove the blue wavelength range.

For the circadian rhythm, refer to "Suppression of melatonin secretion in some blind patients by exposure to bright light," Czeisler C A, Shanahan T L, Klerman E B, Martens H, Brotman D J, Emens J S, Klein T, Rizzo J F 3rd., N Engl J Med. 1995 Jan. 5; 332(1):6-11 and "Evening use of light-emitting eReaders negatively affects sleep, circadian timing, and next-morning alertness," Chang A M, Aeschbach D, Duffy J F, Czeisler C A., Proc Natl Acad Sci USA. 2015 Jan. 27; 112(4):1232-7. doi: 10.1073/pnas.1418490112. Epub 2014 Dec. 22.

For the eyestrain, refer to "Effect of Blue Light-Reducing Eye Glasses on Critical Flicker Frequency," Ide, Takeshi M D, PhD; Toda, Ikuko M D; Miki, Emiko M D; Tsubota, Kazuo M D, Asia-Pacific Journal of Ophthalmology: Post Editor Corrections: Sep. 24, 2014 and "Biological effects of blocking blue and other visible light on the mouse retina," Narimatsu T1, Ozawa Y, Miyake S, Kubota S, Yuki K, Nagai N, Tsubota K., Clin Experiment Ophthalmol. 2014 August; 42(6):555-63. doi: 10.1111/ceo.12253. Epub 2013 Dec. 4.

<Structure of Optical Element>

FIG. 11 shows an example of the structure of the optical element 10 in the present embodiment. In the example shown in FIG. 11, the layered structure 10A is provided on each surface of the base 10B. In the layered structure 10A, a hard coat film is formed on the base 10B to prevent scratches, and the first to thirteenth layers are further layered on the hard coat film. The optical multilayer film in the optical element 10 is formed by alternately layering a low-refractive-index layer and a high-refractive-index layer, for example, in a vacuum deposition method or a sputtering method. Selective reflection of desired light can thus be achieved.

In the example shown in FIG. 11, the base 10B is made, for example, of a thiourethane resin, and the hard coat film is made, for example, of an organic silicon compound having a thickness ranging from 3 to 5 μm. The odd-numbered layers are each formed of a low-refractive-index silicon oxide ($SiO_2$) layer having a predetermined thickness, and the even-numbered layers are each formed of a high-refractive-index zirconium oxide ($ZrO_2$) layer having a predetermined thickness. The thicknesses of the layers, which are shown in FIG. 11, are determined in an optical simulation based on the difference between the low refractive index and the high refractive index. Once a material having the low refractive index and a material having the high refractive index are determined, the optical simulation allows the thickness of each of the layers to be so determined that a predetermined transmission spectrum (or reflection spectrum) is achieved.

The layers are each made of an inorganic compound. In the optical element 10, the high-refractive-index inorganic compound may, for example, be any of a titanium oxide, a zirconium oxide, an aluminum oxide, an yttrium oxide, a tantalum oxide, a hafnium oxide, a tin oxide, a niobium oxide, a cerium oxide, and an indium oxide. The high-refractive-index inorganic compound may alternatively be a shortage equivalent of titanium oxide ($TiO_x$, x is smaller than 2 but close thereto), or an ITO film may be used as at least one of the layers.

In the optical element 10, the low-refractive-index inorganic compound may, for example, be any of Chiolite, Cryolite, aluminum fluoride ($AlF_3$), aluminum fluoride ($MgF_2$), and calcium fluoride ($CaF_2$).

In the optical element 10, the hard coat film is preferably an organosiloxane-based hard coat film. An organosiloxane-based hard coat film is made of an organosiloxane-based resin and inorganic oxide fine particles. The hard coat film is formed by dipping the resin and the particles in a hard coat liquid for hard coating and then evaporating the solvent in a known method. The hard coat liquid is a solution that is a mixture of the organosiloxane-based resin and sol of the inorganic oxide fine particles with water or alcohol-based solvent. It is assumed that the optical element 10 contains both organic and inorganic materials. The number of layers may be determined as appropriate in the optical simulation and is not limited to the number shown in FIG. 11.

Example

Figure 12:
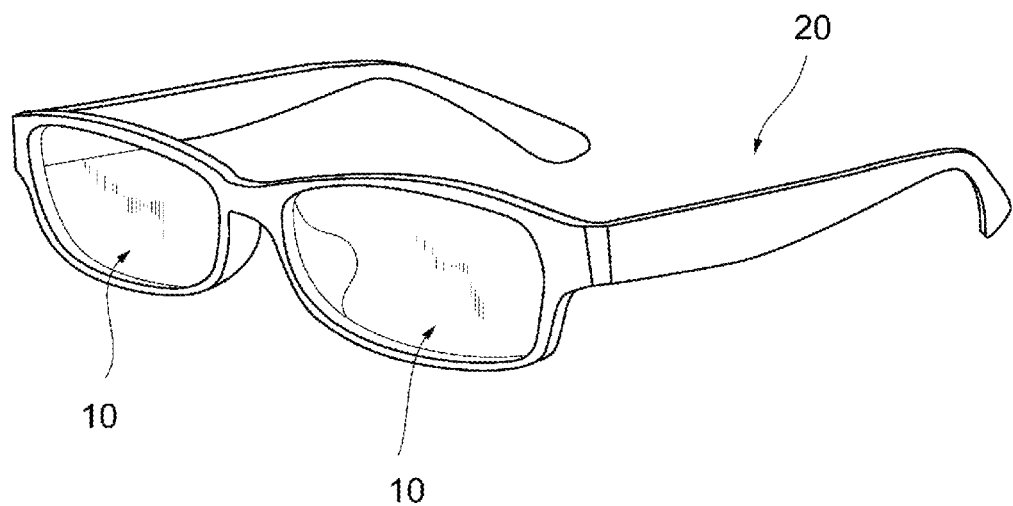
FIG. 12 shows an example of an eyewear using the optical element in Example.

FIG. 12 shows an example of an eyewear 20 using the optical element 10 described above. As shown in FIG. 12, the eyewear 20, which uses the optical element 10 described above as each lens, can provide the myopia suppression effect and also prevent eyestrain and deterioration of visual recognition.

Application of the optical element 10 is not limited to the eyewear 20. The optical element 10 is also applicable to a vision corrector (such as spectacle lens, contact lens, and intraocular lens), an eye protector (such as sunglasses, protection glasses, and goggles), a face protector (such as shield of helmet), a sunscreen (such as parasol and sun visor), a display screen of a display apparatus (such as television, monitor for personal computer, game console, portable media player, mobile phone, tablet terminal, wearable device, 3D glasses, virtual glasses, portable book reader, car navigator, digital camera and other imaging devices, in-vehicle monitor, and in-airplane monitor), a curtain (such as cloth curtain and vinyl curtain), a window (such as windows of building, vehicle, and airplane, and front or rear windshield), a wall (such as glass curtain wall), a cover of a light source (such as illumination cover), and a coating material (such as seal and application liquid), as described above.

The invention claimed is:

1. An optical element having a transmission spectrum characterized in that a local maximum falls within the region of a wavelength longer than 315 nm but shorter than or equal to 400 nm, a local minimum falls within the region of a wavelength longer than or equal to 380 nm but shorter than or equal to 500 nm, and the wavelength at the local maximum is shorter than the wavelength at the local minimum,
   wherein transmittance at the local maximum is greater than or equal to 80% and transmittance at the local minimum is greater than or equal to 40%,
   wherein in the transmission spectrum, transmittance in the region of a wavelength shorter than or equal to 315 nm is lower than or equal to 5%,
   wherein a wavelength of the local maximum is approximately 380 nm and is shorter than 400 nm, and a wavelength from the local maximum to 400 nm comprises a declivity, and
   wherein, in the transmission spectrum, transmittance at all wavelengths longer than 520 nm but shorter than 700 nm is higher than or equal to 95%.

2. The optical element according to claim 1, wherein the transmission spectrum has two extreme values formed of the local maximum and the local minimum in the region of a wavelength longer than 315 nm but shorter than or equal to 500 nm.

3. The optical element according to claim 2, wherein in the transmission spectrum, transmittance in the region of a wavelength longer than 500 nm is higher than or equal to 95%.

4. The optical element according to claim 1, wherein the local maximum falls within the region of a wavelength longer than or equal to 360 nm but shorter than 400 nm.

5. The optical element according to claim 1, wherein the local minimum falls within the region of a wavelength longer than or equal to 400 nm but shorter than or equal to 460 nm.

6. The optical element according to claim 1, wherein the transmittance at the local minimum is smaller than or equal to 60%.

7. An eyewear using the optical element according to claim 1 as a lens.

8. An optical element for preventing myopia and reducing asthenopia, the optical element having a transmission spectrum characterized in that a local maximum falls within the region of a wavelength longer than 315 nm but shorter than or equal to 400 nm, a local minimum falls within the region of a wavelength longer than or equal to 380 nm but shorter than or equal to 500 nm, and the wavelength at the local maximum is shorter than the wavelength at the local minimum, wherein transmittance at the local maximum is greater than or equal to 80% and transmittance at the local minimum is greater than or equal to 40%, wherein in the transmission spectrum, transmittance in the region of a wavelength shorter than or equal to 315 nm is lower than or equal to 5%, wherein a wavelength of the local maximum is approximately 380 nm and is shorter than 400 nm, and a wavelength from the local maximum to 400 nm comprises a declivity, and wherein, in the transmission spectrum, transmittance at all wavelengths longer than 520 nm but shorter than 700 nm is higher than or equal to 95%.

9. The optical element for preventing myopia and reducing asthenopia according to claim 8, wherein the transmission spectrum has two extreme values formed of the local maximum and the local minimum in the region of a wavelength longer than 315 nm but shorter than or equal to 500 nm.

10. The optical element for preventing myopia and reducing asthenopia according to claim 9, wherein in the transmission spectrum, transmittance in the region of a wavelength longer than 500 nm is higher than or equal to 95%.

11. The optical element for preventing myopia and reducing asthenopia according to claim 8, wherein the local maximum falls within the region of a wavelength longer than or equal to 360 nm but shorter than 400 nm.

12. The optical element for preventing myopia and reducing asthenopia according to claim 8, wherein the local minimum falls within the region of a wavelength longer than or equal to 400 nm but shorter than or equal to 460 nm.

13. The optical element for preventing myopia and reducing asthenopia according to claim 8, wherein the transmittance at the local minimum is smaller than or equal to 60%.

14. An eyewear using the optical element for preventing myopia and reducing asthenopia according to claim 8 as a lens.

* * * * *